United States Patent [19]
Barba et al.

[11] Patent Number: 5,825,663
[45] Date of Patent: Oct. 20, 1998

[54] VIBRATION CONTROL SYSTEM

[75] Inventors: Valentin G. Barba, Scotrun, Pa.; David J. C. Crook, Randolph, N.J.; Eugene E. Shube, Elmont, N.Y.

[73] Assignee: GEC-Marconi Aerospace Inc., Whippany, N.J.

[21] Appl. No.: 740,822

[22] Filed: Nov. 4, 1996

[51] Int. Cl.⁶ .......................... G01H 17/00; G01M 7/00
[52] U.S. Cl. .................... 364/508; 74/61; 74/87
[58] Field of Search .................. 364/508; 74/61, 74/22 R, 22 A, 87, 574, 573 R; 73/504.12, 504.07, 504.01

[56] References Cited

U.S. PATENT DOCUMENTS

| | | | |
|---|---|---|---|
| 3,282,292 | 11/1966 | Austin et al. | 74/61 |
| 3,617,020 | 11/1971 | Gerstine | 244/17.27 |
| 4,627,576 | 12/1986 | Hahn et al. | 241/24.1 |
| 5,005,439 | 4/1991 | Jensen et al. | 74/574 |
| 5,347,884 | 9/1994 | Garnjost et al. | 74/573 R |
| 5,584,375 | 12/1996 | Burgess, Jr. et al. | 198/751 |
| 5,675,083 | 10/1997 | Nakamura | 73/504.12 |

*Primary Examiner*—Emanuel T. Voeltz
*Assistant Examiner*—Demetra R. Smith
*Attorney, Agent, or Firm*—Fish & Neave; Robert R. Jackson; Martin A. Leroy

[57] ABSTRACT

Methods and apparatus for generating a linear vibratory output force having a variable amplitude. The force is generated by the cooperation of four rotating eccentric masses that are grouped in two pairs of two masses. The masses in each pair are counter-rotating (i.e., they rotate at the same speed but in opposite directions). The phase relationship between the two pairs is adjustable. For example, the phase of one pair can be advanced while the phase of the other pair is retarded by an equal amount, thereby changing the amplitude of the output force without changing the direction along which the force acts, and also without changing its frequency if desired.

21 Claims, 3 Drawing Sheets

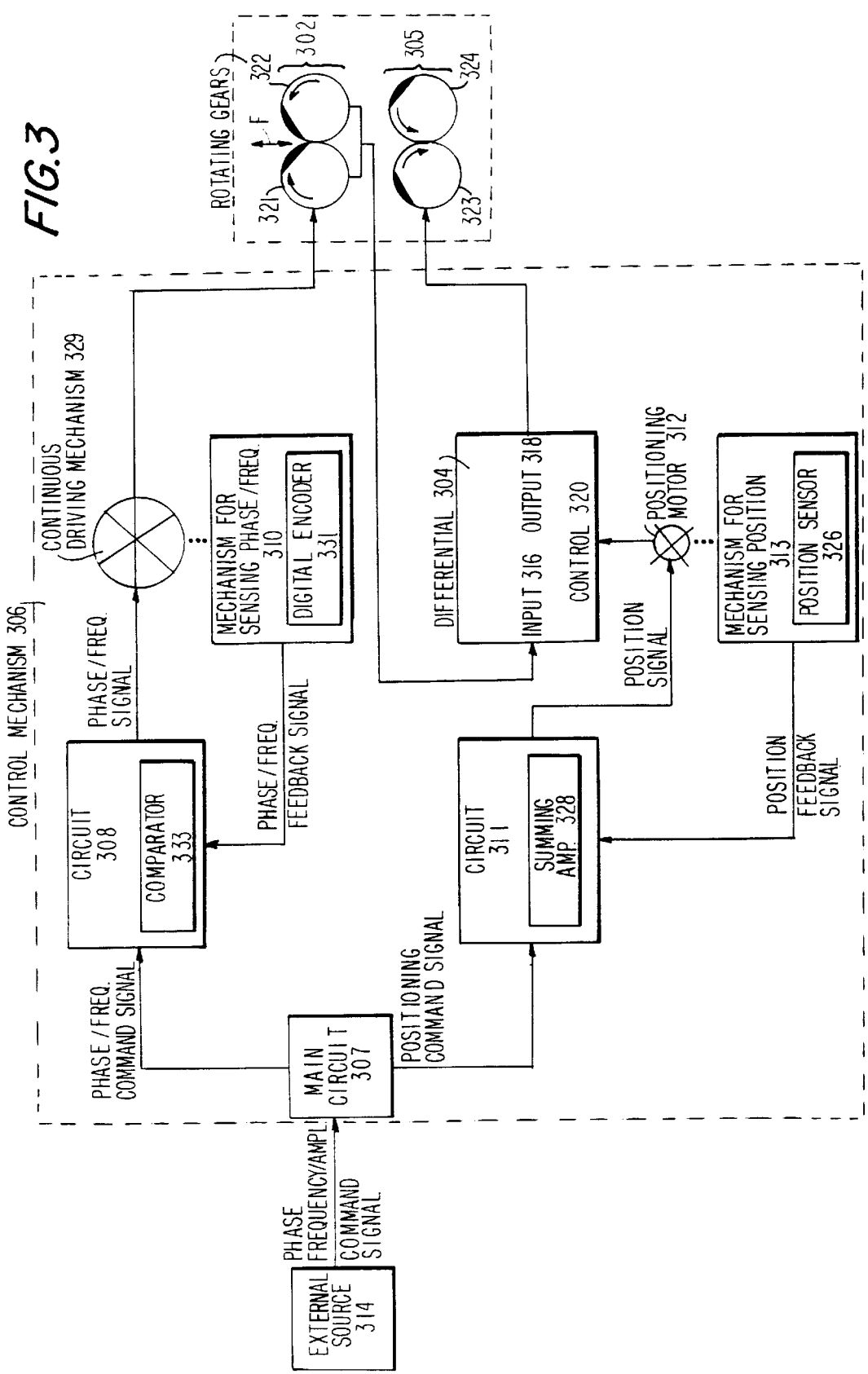

VIBRATION CONTROL SYSTEM

BACKGROUND OF THE INVENTION

This invention relates to improved methods and apparatus for generating a linear vibratory output force (also sometimes called a reciprocating output force) having a controllable amplitude.

A pair of eccentric masses rotating in opposite directions about a common axis in respective closely spaced parallel planes, or rotating in opposite directions about respective parallel axes in a common plane, cooperate to produce an approximately linear vibratory force, assuming (1) that the rotating force vectors of the individual masses have the same amplitude, (2) that both masses rotate at the same speed, and (3) that the masses are properly phased relative to one another. The vibratory output force acts along a line that is parallel to the plane or planes in which the eccentric masses rotate. This line is also perpendicular to a line between the centers of gravity of the two masses when the two masses are at phase angles that differ by 180°.

Two pairs of masses, each pair counter-rotating as described above, can be operated together with their vibratory output forces aligned. Assuming that all four masses rotate at the same speed, the phase relationship between the two pairs influences the extent to which the output forces of the two pairs add to or subtract from one another. Thus the phase relationship between the two pairs controls the amplitude of the net vibratory output force (the vector sum of the vibratory output forces of the two pairs).

There are applications of vibratory force generators in which it is desirable to be able to control amplitude substantially independently of frequency and phase. For example, vibratory force generators may be used to counteract the effect of helicopter rotor blades passing over the fuselage of the helicopter. In general, the frequency and phase of the vibratory force generator output must be matched to rotor speed and angular position. At any given rotor speed, however, the angle of attack of the rotor blades may vary, and this will change the amplitude of the vibratory force generator output that is required to counteract the effect of the rotor blades on the fuselage. Hence the requirement to be able to change vibratory force generator output amplitude substantially independent of frequency and phase.

Austin et al. U.S. Pat. No. 3,208,292 shows a system of four rotating masses in two pairs of two counter-rotating masses powered by a single motor with phase adjustment between the pairs. However, the Austin et al. patent does not disclose or suggest a system which is capable of high-speed, dynamic variation of such vibratory output force parameters as frequency, phase, and amplitude. Nor does the Austin et al. patent disclose or suggest a system which is adapted to produce amplitude variation substantially independently of frequency and phase.

Jensen U.S. Pat. No. 5,005,439 shows a system in which each of four rotating eccentric masses is powered by a separate motor. Assuming separate control of the motors, the Jensen system can produce a wide range of output parameter combinations. But four separate motors may undesirably increase the cost, size, weight, complexity, etc., of the system.

In view of the foregoing, it is an object of this invention to provide improved and simplified linear vibratory force generator apparatus and methods.

It is a more particular object of this invention to provide relatively simple linear vibratory force generator apparatus and methods which can perform such functions as varying the amplitude of the output force substantially independently of the frequency and phase of that force.

SUMMARY OF THE INVENTION

These and other objects of the invention are accomplished in accordance with the principles of the invention by using two pairs of eccentric masses, each pair including two counter-rotating eccentric masses that rotate in a fixed relationship to each other through a mechanical linkage. The masses in each pair are oriented such that the net force generated by the pair lies along a line that is perpendicular to an axis of rotation of the pair. The pairs of masses are oriented such that the net forces produced by each pair interact to form a resultant linear vibratory output force in a direction substantially along the same line. The phase relationship between the net force generated by the first pair and the net force generated by the second pair is adjustable such that the resultant amplitude of the combination of the net forces of the pairs is between zero and the sum of the values of the amplitudes of the net forces of both pairs. Furthermore, when adjusting the amplitude of the vibratory output force, the phase (and also substantially the frequency) of the output force may be maintained by advancing the phase of one rotating pair by a specific amount with respect to the phase of the original output force, while retarding the phase of the second rotating pair by the same amount with respect to the phase of the original output force. The phase of one pair is advanced by increasing the frequency of rotation of that pair for a specific amount of time and then returning to the original desired frequency. Likewise, the phase of the other pair is retarded by decreasing the frequency of rotation of that pair for a specific time and then returning to the original desired frequency. A suitable control system is utilized to adjust the phase relationships between the mass pairs and the starting output force function. The control system may be designed so that the output force generated maintains the phase, frequency, and amplitude dictated to the control system from an external source. For example, the external source may be a computer located on a helicopter for the purpose of determining the output force frequency, amplitude, and phase necessary to cancel unwanted vibrations in the helicopter.

Further features of the invention, its nature and various advantages will be more apparent from the accompanying drawings and the following detailed description of the preferred embodiments.

BRIEF DESCRIPTION OF THE DRAWINGS

FIG. 3 is a simplified schematic block diagram of still another illustrative embodiment of the invention.

DETAILED DESCRIPTION OF THE PREFERRED EMBODIMENTS

Figure 1:
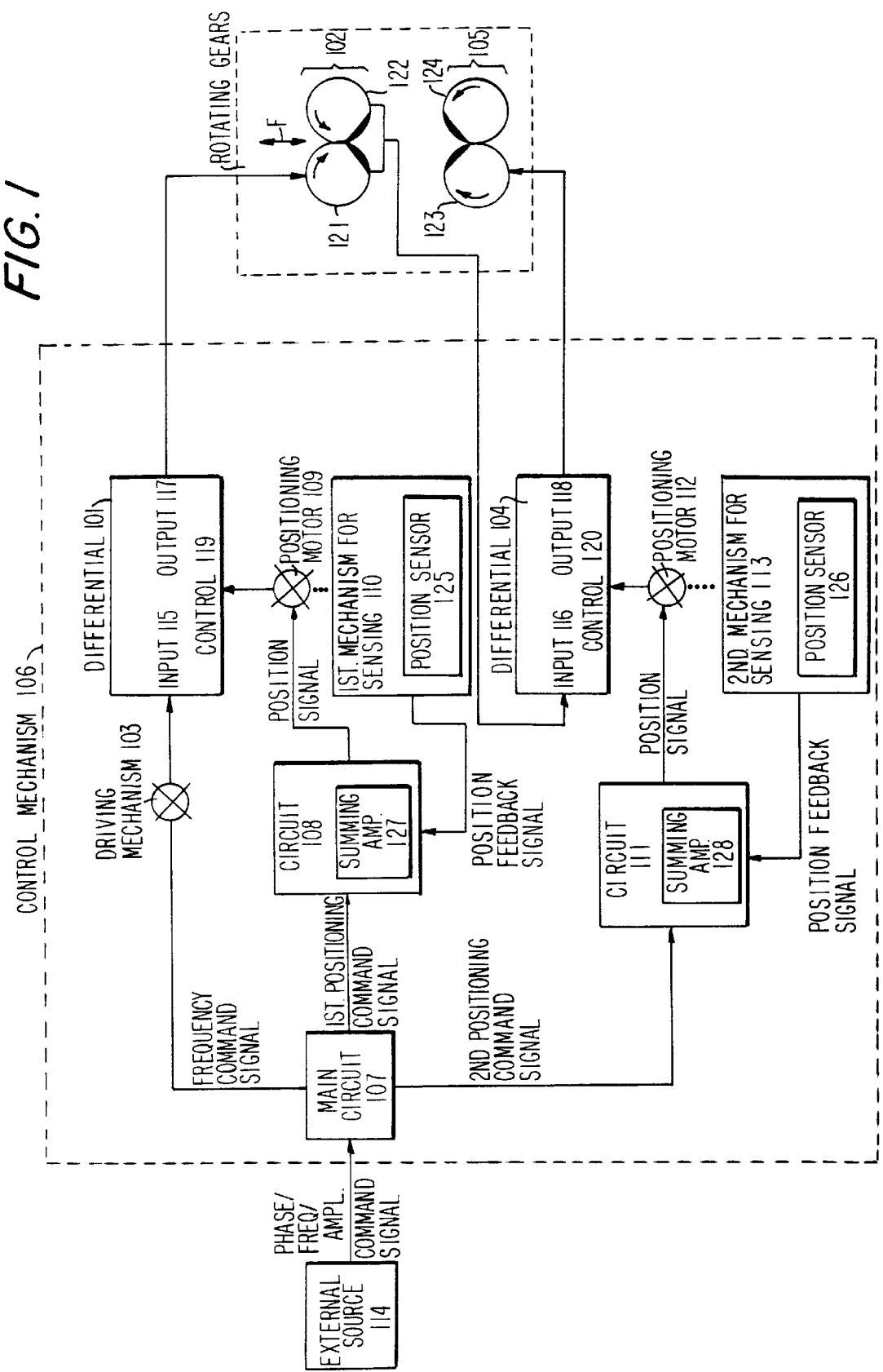
FIG. 1 is a simplified schematic block diagram of an illustrative embodiment of the invention.

In a first illustrative embodiment utilizing two pairs of counter-rotating eccentric masses as depicted in FIG. 1, the first pair 102 of masses 121 and 122 is driven by a differential unit 101 that is linked between the first pair of masses and a driving mechanism 103. A second differential unit 104 is linked between the first pair of masses 102 and the second pair 105 of masses 123 and 124. Second differential unit 104 is used to either advance or retard the phase of first pair 102 relative to second pair 105. First differential unit 101 may be used to advance the phase of first pair 102, thus requiring second differential unit 104 to be used to retard the phase of second pair 105 in order to maintain the phase of the linear vibratory output force F produced by the combination of both pairs 102 and 105. For example, if a change in the amplitude of output force F is required without a change in the phase of that force, and if that change in amplitude requires the phase of first pair 102 to be advanced by 10 degrees with respect to the starting output force, then the phase of second pair 105 must be retarded by 10 degrees with respect to the starting output force. Similarly, it should be noted that a change in amplitude can be accomplished by retarding first pair 102 and advancing second pair 105.

In this embodiment and in the two embodiments discussed below, the eccentric masses are circular shaped plates (e.g., 121, 122, 123, and 124) with gear teeth to intermesh with each other to form a gear pair. The two gear pairs are arranged as depicted, for example, in FIG. 1 such that the forces they generate fall substantially along a line that is perpendicular to a line between the centers of the plates in each pair. This line additionally lies substantially in the plane of rotation of the masses. However, in a slightly different arrangement the two pairs of gears may lie on top of each other with minimal space separating the pairs. In this situation, the pairs of masses generate forces along lines that are parallel to each other but separated by the distance between the planes of rotation of the pairs. Consequently, a relatively small couple having little significance may be generated during operation.

Referring back to FIG. 1, the frequencies of rotation of gear pairs 102 and 105, and consequently the phase, frequency, and amplitude of the vibratory output force F generated by the device, are controlled by a control mechanism 106. Control mechanism 106 contains several components: a main circuit 107 for receiving a phase/frequency/amplitude command signal; a driving mechanism 103; the differential units 101 and 104 discussed above; a first circuit 108 for receiving the first positioning command signal; a first positioning motor 109; a first mechanism 110 for sensing the position of the first positioning motor; a second circuit 111 for receiving the second positioning command signal; a second positioning motor 112; and a second mechanism 113 for sensing the position of the second positioning motor.

Main circuit 107 receives a phase/frequency/amplitude command signal from external signal source 114 and responds to that signal by generating appropriate first positioning command, second positioning command, and frequency command signals. In particular, main circuit 107 utilizes the phase/frequency/amplitude command signal to generate the positioning command signals that are applied to positioning motors 109 and 112. If the phase/frequency/amplitude command signal calls for a change in output force amplitude, positioning command signals are produced which cause rotating pairs 102 and 105 to adjust their phase relationships with respect to the original vibratory output force in order to generate the desired amplitude of the new output force.

Driving mechanism 103 may be an electric motor which receives the frequency command signal from the main circuit 107. By increasing the frequency of driving mechanism 103, the frequency of output force F may be increased. Likewise, by decreasing the frequency of driving mechanism 103, the frequency of output force F may be decreased.

Each of differentials 101 and 104 has a respective input 115 or 116, a respective output 117 or 118, and a respective control input 119 or 120. Positioning motors 109 and 112 are respectively linked to control inputs 119 and 120 of differentials 101 and 104 and rotate the associated differential control elements through angles that are respectively required by first and second circuits 108 and 111. The input 115 of first differential 101 is connected to driving mechanism 103, and the output 117 of first differential 101 is connected to one of the gears 121 or 122 of the first pair of masses 102. The input 116 of second differential 104 is connected to one of the gears 121 or 122 of first pair 102, and the output 118 of second differential 104 is connected to one of the gears 123 or 124 of the second pair of masses 105. By adjusting the control elements of a differential through an angle determined by a positioning command signal, the frequency of rotation of the gear pair connected to the output of the differential is either increased or decreased while the differential control elements are being adjusted. In this manner, the phase of a gear pair is adjusted.

The mechanisms 110 and 113 for sensing the positions of the positioning motors may be connected directly or indirectly to the positioning motors 109 and 112. Mechanisms 110 and 113 may contain any suitable position sensing devices 125 and 126 to directly detect the angular positions of positioning motors 109 and 112 or to indirectly detect the angular positions of positioning motors 109 and 112 through the angular positions of differential control elements 119 and 120. Position sensing devices are well known in the art and may be transducers, optical sensors, or any of a variety of other sensing devices. Position sensing mechanisms 110 and 113 provide position feedback signals to the circuits for receiving positioning command signals 108 and 111. Those circuits, 110 and 113, combine the positioning command signals with the position feedback signals in summing amplifiers 127 and 128, or in other equivalent electrical circuitry, to generate positioning signals that are applied to positioning motors 109 and 112.

Figure 2:
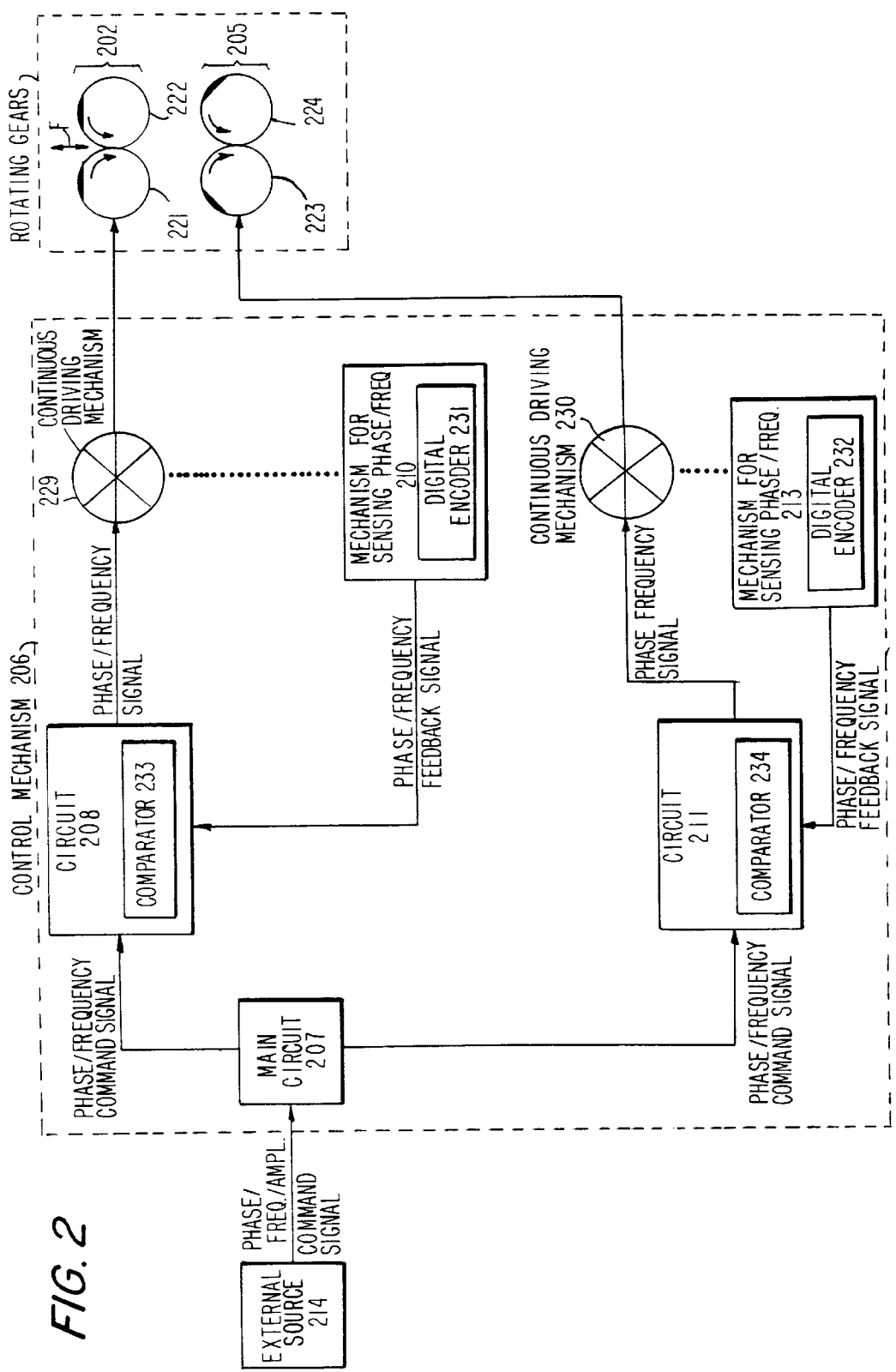
FIG. 2 is a simplified schematic block diagram of another illustrative embodiment of the invention.

In a second illustrative embodiment shown in FIG. 2, the first pair of masses 202 is driven by one direct or continuous driving mechanism 229 and the second pair of masses 205 is driven by a separate direct or continuous driving mechanism 230. In this embodiment, the phases of pairs 202 and 205 are adjusted by varying the frequencies of continuous driving mechanisms 229 and 230. The arrangement of eccentric masses 221, 222, 223, and 224 is similar to that used in the first embodiment.

The frequencies of rotation of gear pairs 202 and 205, and consequently the phase, frequency, and amplitude of the vibratory output force generated by the device, are controlled by a control mechanism 206. Control mechanism 206 contains several components: a main circuit 207 for receiving a phase/frequency/amplitude command signal; continuous driving mechanisms 229 and 230; a first circuit 208 for receiving a phase/frequency command signal; a second circuit 211 for receiving a second phase/frequency command signal; a first mechanism 210 for sensing the phase and frequency of first continuous driving mechanism 229; and a second mechanism 213 for sensing the phase and frequency of second continuous driving mechanism 230.

The main circuit 207 for receiving the phase/frequency/amplitude command signal generates the first phase/frequency command signal and the second phase/frequency command signal. Main circuit 207 is connected to an external source 214 that provides the phase/frequency/amplitude command signal that is to be generated by the device. Main circuit 207 utilizes the phase/frequency/amplitude command signal to generate the phase/frequency command signals for continuous driving mechanisms 229 and 230. The phase/ frequency command signals are determined such that they cause rotating pairs 202 and 205 to adjust their phase relationships with respect to the starting vibratory output force F in order to generate the desired amplitude of the new output force.

The mechanisms 210 and 213 for sensing the phases and frequencies of continuous driving mechanisms 229 and 230 may be connected directly or indirectly to those driving mechanisms. Mechanisms 210 and 213 may contain any phase and frequency sensing devices 225 and 226 to directly detect the phases and frequencies of continuous driving mechanisms 229 and 230 or to indirectly detect the phases and frequencies of the continuous driving mechanisms through any other rotating devices linked to the driving mechanisms, such as rotating masses 221, 222, 223 and 224. Phase and frequency sensing devices are well known in the art and may be digital encoders such as 231 and 232. The mechanisms 210 and 213 for sensing the phase and frequencies of continuous driving mechanisms 229 and 230 provide phase/frequency feedback signals to the circuits 208 and 211 for receiving the phase/frequency command signals. Those circuits, 208 and 211, combine the phase/frequency command signals with the phase/frequency feedback signals in phase/frequency comparators 233 and 234 to generate phase/frequency signals for continuous driving mechanisms 229 and 230.

In a third illustrative embodiment shown in FIG. 3, the first pair of masses 302 is driven by a direct or continuous driving mechanism 329, and the second pair of masses 305 is driven by a differential unit 304 linked between the first and second pairs. This embodiment is a hybrid of the two embodiments discussed above and functions on the same principles. The phase of the first pair 302 is adjusted by varying the frequency of continuous driving mechanism 329, and the phase of the second pair 305 is adjusted by utilizing a positioning motor 312 to rotate the control elements 320 of differential unit 304 linking first and second pairs 302 and 305. This embodiment combines one piece of the control mechanism from the first embodiment with one piece of the control mechanism from the second embodiment. The linking component between the two pieces is the main circuit 307 for receiving the phase/frequency/command signal. The main circuit 307 in this embodiment generates a positioning command signal and a phase/frequency command signal.

Again, as in the first embodiment, a mechanism 313 for sensing the position of positioning motor 312 generates a position feedback signal and provides it to a circuit 311 for receiving the positioning command signal. The circuit 311 for receiving the positioning command signal combines the position feedback signal with the positioning command signal in a summing amplifier 328, or in any other equivalent electrical circuitry, to generate a position signal for positioning motor 312.

Again, as in the second embodiment, a mechanism 310 for sensing the phase and frequency of continuous driving mechanism 329 provides a phase/frequency feedback signal to a circuit 308 for receiving the phase/frequency command signal. Circuit 308 combines the phase/frequency feedback signal with the phase/frequency command signal to generate a phase/frequency signal for continuous driving mechanism 329.

From a functional standpoint, it is important to note that the phase of the linear vibratory output force F in the embodiments discussed above may be shifted with respect to the command signal either by temporarily increasing or decreasing the frequencies of both rotating pairs the same amount for a specific length of time, or by adjusting the frequency of just one of the rotating pairs. In the former scenario, the amplitude of the vibratory output force F may be maintained. In the latter scenario, the amplitude of the vibratory output force F changes.

Additionally, from a functional standpoint, it should be understood that either the first pair or the second pair may be chosen as the pair to be advanced in phase when adjusting the amplitude of the vibratory output force F. Furthermore, in the three embodiments discussed above, the directions of rotation of the pairs with respect to one another is irrelevant because it is only the net forces, which already act along a line, that are combined to form the vibratory output force F. The rotational characteristic of the force vectors associated with the individual masses loses significance due to the equal and opposite effect of each mass's counter-rotating counterpart mass.

In the three embodiments discussed above, it should be understood that the individual masses within a counter-rotating pair may be of any suitable shape to create an appropriate eccentricity. Furthermore, the masses may be in the form of concentric shells so that the masses share a single plane and axis of rotation, generating no couple as a result. Also, the masses within a pair may be mechanically linked in any appropriate manner. For example, a chain linking or other timing belt mechanism would suffice. The means for linking the masses is only important to the extent that the individual masses within a pair retain their phase relationship with one another.

Any suitable differential mechanisms may be used for differentials 101, 104, and 304 in the first and third embodiments. For example, planetary differentials, spur gear differentials, or bevel gear differentials may be used. Moreover, any of the three connections or ports to each differential may be used as any of the "input", "output", and "control" ports of that differential.

One skilled in the art will appreciate that the present invention can be practiced by other than the described embodiments, which are presented here for purposes of illustration and not of limitation, and the present invention is limited only by the claims that follow.

The invention claimed is:

1. A method for varying the amplitude of a substantially linear vibratory output force, said output force being generated by a device having a first pair of counter-rotating eccentric masses which are mechanically linked so that they generate a first periodic force which always acts along a line which is fixed in a plane perpendicular to an axis of rotation of said first pair and having a second pair of counter-rotating eccentric masses which are mechanically linked so that they generate a second periodic force which always acts along said line, said first periodic force and said second periodic force algebraically combining to produce said vibratory output force acting along said line, said method comprising the steps of:

controlling the phase of rotation of said first pair of counter-rotating eccentric masses relative to the phase of said vibratory output force to advance said phase of said first pair relative to said phase of said vibratory output force by a specific amount; and simultaneously controlling the phase of rotation of said second pair of counter-rotating eccentric masses relative to said phase of said vibratory output force to retard said phase of said second pair relative to said phase of said vibratory output force by said specific amount.

2. The method defined in claim 1 wherein said first pair has an associated frequency of rotation and said second pair has an associated frequency of rotation, and wherein said step of controlling the phase of rotation of said first pair comprises the step of adjusting said associated frequency of rotation of said first pair, and wherein said step of controlling the phase of rotation of said second pair comprises the step of adjusting said associated frequency of rotation of said second pair.

3. The method defined in claim 1 wherein said device further includes a driving mechanism, a first differential unit, and a second differential unit, said first differential unit operatively connecting said driving mechanism and one of said first pair or said second pair, and said second differential unit operatively connecting said first pair and said second pair, wherein said step of controlling the phase of rotation of said one of said first pair or said second pair comprises the step of adjusting said first differential unit, and wherein said step of controlling the phase of rotation of the other of said first pair or said second pair comprises the step of adjusting said second differential unit.

4. The method defined in claim 1 wherein said device further includes a driving mechanism, a first differential unit having an input, an output, and a control, said input of said first differential unit being mechanically linked to said driving mechanism, and said output of said differential unit being mechanically linked to one of said first pair or said second pair, and a second differential unit having an input, an output, and a control, said input of said second differential unit being mechanically linked to the other of said first pair or said second pair, and said output of said differential unit being mechanically linked to said other of said first pair or said second pair, wherein said step of controlling the phase of rotation of said one of said first pair or said second pair comprises the step of adjusting said control of said first differential unit, and wherein said step of controlling the phase of rotation of said other of said first pair or said second pair comprises the step of adjusting said control of said second differential unit.

5. The method defined in claim 1 wherein said device further includes a continuous driving mechanism having an associated frequency of rotation, said continuous driving mechanism being operatively connected to said one of said first pair or said second pair, and a differential unit operatively connected between said first pair and said second pair, wherein said step of controlling the phase of rotation of said one of said first pair or said second pair comprises the step of adjusting said associated frequency of rotation of said continuous driving mechanism, and wherein said step of controlling the phase of rotation of said other of said first pair or said second pair comprises the step of adjusting said differential unit.

6. The method defined in claim 1 wherein said device further includes a continuous driving mechanism having an associated frequency of rotation, said continuous driving mechanism being operatively connected to one of said first pair or said second pair, and a differential unit having an input, an output, and a control, said input being operatively connected to said one of said first pair or said second pair, said output being operatively connected to said other of said first pair or said second pair, wherein said step of controlling the phase of rotation of said one of said first pair or said second pair comprises the step of adjusting said associated frequency of rotation of said continuous driving mechanism, and wherein said step of controlling the phase of rotation of said other of said first pair or said second pair comprises the step of adjusting said control of said differential unit.

7. The method defined in claim 1 wherein said device further includes a first continuous driving mechanism having an associated frequency of rotation, and a second continuous driving mechanism having an associated frequency of rotation, wherein said step of controlling the phase of rotation of one of said first pair or said second pair comprises the step of adjusting said associated frequency of rotation of said first continuous driving mechanism, and wherein said step of controlling the phase of rotation of said other of said first pair or said second pair comprises the step of adjusting said associated frequency of rotation of said second continuous driving mechanism.

8. An apparatus for generating a reciprocating output force with a variable amplitude, said apparatus comprising:

a first pair of counter-rotating eccentric masses which are mechanically linked so that they cooperate to generate a first reciprocating force acting along a first line which is substantially fixed in a plane substantially perpendicular to an axis of rotation associated with said first pair;

a second pair of counter-rotating eccentric masses which are mechanically linked so that they cooperate to generate a second reciprocating force acting along a second line which is substantially coincident with said first line, said first reciprocating force and said second reciprocating force combining to produce said reciprocating output force; and a control mechanism operatively connected to said first pair and said second pair for rotating said first pair and for rotating said second pair and for varying the amplitude of said reciprocating output force by advancing the phase of said first pair relative to the phase of said reciprocating output force by a specific amount, and by retarding the phase of said second pair relative to said phase of said reciprocating output force by said specific amount.

9. The apparatus defined in claim 8 wherein said control mechanism further comprises:

a driving mechanism;

a first differential unit operatively connected to said driving mechanism and one of said first pair or said second pair; and a second differential unit operatively connected to said first pair and said second pair.

10. The apparatus defined in claim 9 wherein said control mechanism further comprises:

a first positioning motor operatively connected to said first differential unit; and a second positioning motor operatively connected to said second differential unit.

11. The apparatus defined in claim 10 wherein said first differential unit has an input, an output, and a control, and said second differential unit has an input, an output, and a control, said input of said first differential unit being operatively connected to said driving mechanism, said output of said first differential unit being operatively connected to one of said first pair or said second pair, and said control of said first differential unit being operatively connected to said first positioning motor, said input of said second differential unit being operatively connected to said first pair, said output of said second differential unit being operatively connected to the other of said first pair or said second pair, and said control of said second differential unit being operatively connected to said second positioning motor.

12. The apparatus defined in claim 10 wherein said control mechanism further comprises:

a first mechanism for sensing the position of said first positioning motor and producing a first position feedback signal;

a first circuit for receiving a first positioning command signal, receiving said first position feedback signal, and producing a first positioning signal to said first positioning motor;

a second mechanism for sensing the position of said second positioning motor and producing a second position feedback signal;

a second circuit for receiving a second positioning command signal, receiving said second position feedback signal, and producing a second positioning signal to said second positioning motor; and a circuit for receiving a phase/frequency/amplitude command signal and for producing said first positioning command signal to said first circuit and for producing said second positioning command signal to said second circuit.

13. The apparatus defined in claim 12 wherein said first mechanism for sensing further comprises a first position sensor, wherein said first circuit for receiving further comprises a first summing amplifier electrically connected to said first positioning motor, said first position sensor being operatively connected to said first positioning motor, said first position sensor being electrically connected to said first summing amplifier, wherein said second mechanism for sensing further comprises a second position sensor, and wherein said second circuit for receiving further comprises a second summing amplifier, said second position sensor being operatively connected to said second positioning motor, and said second position sensor being electrically connected to said second summing amplifier so that said second position sensor provides feedback to said second summing amplifier.

14. The apparatus defined in claim 8 wherein said control mechanism further comprises:

a continuous driving mechanism operatively connected to said first pair; and a differential unit operatively connected between said first pair and said second pair.

15. The apparatus defined in claim 14 wherein said control mechanism further comprises:

a positioning motor operatively connected to said first differential unit.

16. The apparatus defined in claim 15 wherein said differential unit has an input, an output, and a control, said input of said differential unit being operatively connected to said first pair, said output of said differential unit being operatively connected to said second pair, and said control of said differential unit being operatively connected to said positioning motor.

17. The apparatus defined in claim 15 wherein said continuous driving mechanism has an associated frequency of rotation and wherein said control mechanism further comprises:

a mechanism for sensing the position of said positioning motor and producing a position feedback signal;

a circuit for receiving a positioning command signal, receiving said position feedback signal, and producing a positioning signal to said positioning motor;

a mechanism for sensing the phase and said frequency associated with said continuous driving mechanism and producing a phase/frequency feedback signal; and a circuit for receiving a phase/frequency command signal, receiving said phase/frequency feedback signal, and producing a phase/frequency signal to said continuous driving mechanism; and a circuit for receiving a phase/frequency/amplitude command signal and for producing said positioning command signal and said phase/frequency command signal.

18. The apparatus defined in claim 17 wherein said mechanism for sensing the position of said positioning motor further comprises a position sensor; wherein said circuit for receiving a positioning command signal further comprises a summing amplifier, said summing amplifier electrically being connected to said signal processor and said positioning motor, said position sensor being operatively connected to said positioning motor, and said position sensor being electrically connected to said summing amplifier; wherein said mechanism for sensing the position of said positioning motor further comprises a digital encoder; and wherein said circuit for receiving a phase/frequency command signal further comprises a phase/frequency comparator electrically connected to said continuous driving mechanism, said digital encoder being operatively connected to said continuous driving mechanism, and said digital encoder being electrically connected to said phase/frequency comparator.

19. The apparatus defined in claim 8 wherein said control mechanism further comprises:

a first continuous driving mechanism having an associated frequency of rotation and which is operatively connected to said first pair; and a second continuous driving mechanism having an associated frequency of rotation and which is operatively connected to said second pair.

20. The apparatus defined in claim 19 wherein said control mechanism further comprises:

a circuit for receiving a phase/frequency/amplitude command signal and for producing a first phase/frequency command signal and a second phase/frequency command signal;

a first mechanism for sensing the phase and said associated frequency of said first continuous driving mechanism and producing a first phase/frequency feedback signal;

a first circuit for receiving said first phase/frequency command signal, for receiving said first phase/frequency feedback signal, and for producing a first phase/frequency signal to said first continuous driving mechanism;

a second mechanism for sensing the phase and said associated frequency of said second continuous driving mechanism and producing a second phase/frequency feedback signal; and a second circuit for receiving said second phase/frequency command signal, receiving said second phase/frequency feedback signal, and producing a second phase/frequency signal to said second continuous driving mechanism.

21. The apparatus defined in claim 20 wherein said first mechanism for sensing the phase and said frequency associated with said first continuous driving mechanism further comprises a first digital encoder; wherein said first circuit for receiving said first phase/frequency command signal further comprises a first phase/frequency comparator electrically connected to said first continuous driving mechanism, said first digital encoder being operatively connected to said first continuous driving mechanism, and said first digital encoder being electrically connected to said first phase/frequency comparator; wherein said second mechanism for sensing the phase and said frequency associated with said second continuous driving mechanism further comprises a second digital encoder; and wherein said second circuit for receiving said second phase/frequency command signal further comprises a second phase/frequency comparator electrically connected to said second continuous driving mechanism, said second digital encoder being operatively connected to said second continuous driving mechanism, and said second digital encoder being electrically connected to said second phase/frequency comparator.

* * * * *